United States Patent [19]
Jenei

[11] 3,790,420
[45] Feb. 5, 1974

[54] METHOD OF MAKING A SUNSHADE

[75] Inventor: Joseph Jenei, Detroit, Mich.

[73] Assignee: General Motors Corporation, Detroit, Mich.

[22] Filed: Nov. 8, 1971

[21] Appl. No.: 196,341

[52] U.S. Cl.............. 156/251, 156/273, 156/285, 156/515

[51] Int. Cl...................... B32b 31/00, B29c 17/00

[58] Field of Search.... 156/273, 251, 380, 515, 285

[56] References Cited
UNITED STATES PATENTS

| | | | |
|---|---|---|---|
| 3,242,245 | 3/1966 | Greig et al. | 156/285 |
| 2,483,234 | 9/1949 | Roberts | 156/251 |
| 3,234,064 | 2/1966 | Smith | 156/251 |
| 3,655,477 | 4/1972 | Scholl et al. | 156/202 |
| 3,466,214 | 9/1969 | Polk et al. | 156/213 |

Primary Examiner—Douglas J. Drummond
Assistant Examiner—M. G. Wityshyn
Attorney, Agent, or Firm—E. J. Biskup

[57] ABSTRACT

A method of forming a sunshade envelope in a dielectric embossing press having a pair of opposed electrodes with one of the electrodes having a sharp upstanding edge around a cavity formed in the electrode. The method comprises the steps of positioning a pair of superposed sheets of thermoplastic material over the cavity and closing the press so as to cause the sheets to be compressed between the electrodes along a tear line created by the upstanding edge. The portion of the thermoplastic sheets adjacent the upstanding edge are then positioned in axial alignment and abutting relationship along a vertical plane followed by applying a high frequency alternating current between the electrodes so as to establish a concentrated electric field at the upstanding edge that serves to fuse the sheets along the upstanding edge and along the vertical plane so as to maintain the portion of the sheets in axial alignment.

1 Claim, 6 Drawing Figures

PATENTED FEB 5 1974 3,790,420

METHOD OF MAKING A SUNSHADE

One method of forming a sunshade shell or envelope can be seen in Nelson et al. U.S. Pat. No. 3,542,416 which issued on Nov. 24, 1970, and is assigned to the assignee of this invention. Nelson et al teaches the use of a dielectric embossing press for forming the sunshade envelope and, initially, two sheets of thermoplastic material are superposed one above the other and placed between the upper and lower electrodes of the press. The upper electrode is formed so as to have a blade of a configuration conforming with the desired sunshade body shape so that upon closing the press and after impressing the alternating current between the electrodes, the outer edges of the thermoplastic sheets are bonded together in an overlapping fashion. This method, although providing an enclosed envelope with the edges thereof sealed together, is not considered to be completely satisfactory from an aesthetic standpoint because the edges of the sunshade shell project outwardly making it very evident that two sheets have been joined together along a seam line.

Accordingly, the present invention is directed to a method of forming a sunshade envelope of the above-described type wherein the joined edges of the thermoplastic sheets are located in a single plane in abutting relationship without having the heretofore objectionable protruding edge. The method utilizes a dielectric embossing press in which each of the upper and lower electrodes are formed with an identical cavity portion located therein so that a chamber is formed when the press is closed. One of the electrodes has a sharp upstanding continuous edge along the perimeter of the cavity with the edge serving the dual function of cooperating with the other electrode for fusing the two sheets together and also providing a tear line along which excess material can be removed. In the preferred form, the subject method comprises the positioning of a pair of coextensive superposed sheets of thermoplastic material on the lower electrode so as to completely cover the cavity therein with the edges of the sheets extending laterally beyond the cavity. The press is then closed to cause the thermoplastic sheets to be compressed between the electrodes along a tear line created by the sharp edge so as to form an envelope. Thereafter, a pressure differential is created between the inside and the outside of the envelope so as to cause the portion of the thermoplastic sheets adjacent the sharp edge to be positioned in axial alignment and abutting relationship along a substantially vertical plane. A high frequency alternating current is then impressed across the upper and lower electrodes so as to establish a concentrated electric field at the sharp edge resulting in the electric field fusing the sheets along the sharp edge and along the vertical plane so as to maintain the sheets in axial alignment.

The objects of the present invention are to provide a method making a sunshade envelope in a dielectric embossing press wherein a pair of thermoplastic sheets are joined together at a seam that does not protrude from the body of the sunshade; and to provide a method of making an envelope utilizing a pair of superposed thermoplastic sheets that are bonded together in a dielectric embossing press in a manner so that the outer surfaces of the sheets at the bonding line are located in a common plane without having an outwardly projecting edge.

Other objects and advantages of the present invention will be apparent from the following detailed description when taken with the drawings in which.

Figure 1:
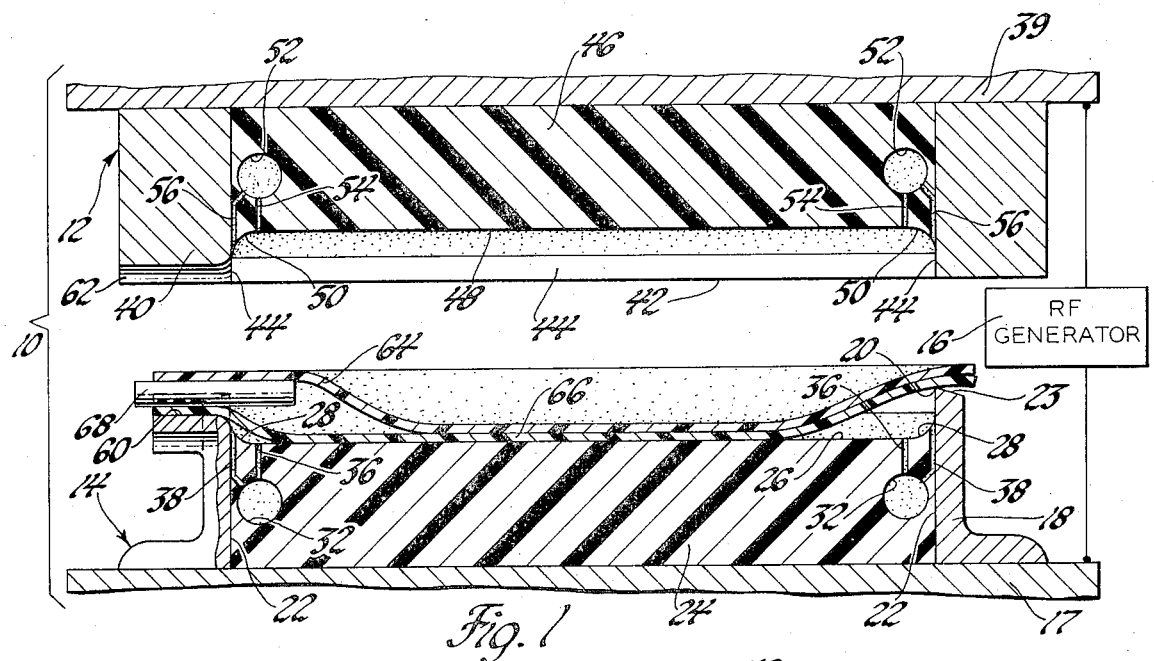
FIG. 1 is a schematic view of a dielectric embossing press supporting a pair of superposed thermoplastic sheets which are to be formed into a sunshade envelope.

Referring to the drawings and more particularly to FIG. 1 thereof, a dielectric embossing press 10 is shown comprising in general an upper electrode 12 and a lower electrode 14, both of which are connected electrically in series with a radio frequency alternating current generator 16. The upper electrode 12 is movable through operating means (not shown) toward and away from the lower electrode 14 while the generator 16 is capable of impressing an alternating current at a frequency between 1 and 100 megacycles between the electrodes. This type of heating or embossing press is well known in the art and, therefore, further description thereof is not believed to be necessary.

The lower electrode 14 includes a platen 17 which is rigidly formed with and electrically connected to an upstanding blade 18. Although not shown, it will be understood that the blade 18, when viewed in plan view, will have the desired closed configuration for forming an elongated generally eliptical sunshade shell or envelope of the type shown in the aforementioned Nelson et al patent. To this end, the upper end of the blade 18 terminates with a sharp edge 20 which is continuous and defined by a vertical inner surface 22 and an inclined surface 23. A formed cavity is located within the area defined by the inner surface 22 of the blade 18. In this regard, a plastic filler member 24 fills the latter-mentioned area and has an upper surface 26 which is flat and located in a horizontal plane below the plane of the edge 20. Immediately adjacent the blade 18, a portion 28 of the member 24 is generally curved so as to provide the usual rounded edges for the sunshade body.

A passage 32 is formed in the filler member 24 that extends along the blade 18 adjacent to and along the inner surface 22 thereof and is connected to a source (not shown) of subatmospheric pressure. The passage 32 is in the form of a closed loop and communicates with a plurality of vertically extending paired passages 36 and 38 which open at the extreme ends of the curved portion 28 of the plastic filler member 24. It will be understood that similar passages 36 and 38 connect with the passage 32 at spaced points along the inner surface 22 of the blade. The number of paired passages 36 and 38 to be provided will depend upon factors which will become apparent as the description of the invention proceeds.

The upper electrode 12 also includes a platen 39 which in this case rigidly supports a die 40, the lower end of which is formed with a flat surface 42 that lies in a horizontal plane. The die 40 has an inner surface 44, which at all points, is located in vertical alignment with the inner surface 22 of blade 18 and accordingly registers therewith. Thus, it should be apparent that the blade 18 and the die 40, when viewed in cross section, will have the identical sunshade shape defined by the inner surfaces 22 and 44. In addition, the area bounded by the inner surface 44 has a plastic filler member 46 that cooperates with the inner surface 44 to make a formed cavity which is identical in configuration with the cavity in the plastic filler member 24. Thus, the filler member 46 also has a planar surface 48 located in a horizontal plane which merges with a curved portion 50 that is located adjacent to the inner surface 44 at all points thereof. Also, a passage 52 is provided in the filler member 46 which extends along the inner surface 44 and connects with a plurality of vertical passages 54 and 56 which open at the extreme ends of the curved portion 50 at spaced points therealong as in the case of the passages 36 and 38 formed in the filler member 24.

Figure 5:
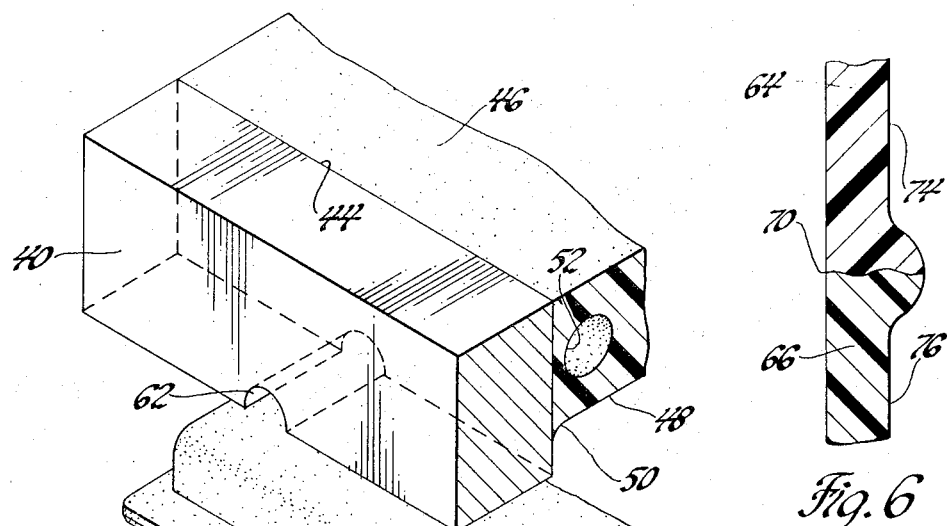
FIG. 5 is an isometric view of a portion of the dielectric embossing press of FIGS. 1 through 4 and also shows a portion of the completed sunshade envelope made in accordance with the invention.

It will also be noted that as seen in FIG. 5, both the blade 18 and the die 40 are respectively formed with transversely extending semicylindrical grooves 60 and 62, which, when the press is closed, register together so as to provide a cylindrical opening leading into the chamber formed by the cavities in the electrodes 12 and 14. The reason for the cylindrical opening will be apparent from the description of the operation of the invention which will now be given.

To practice the invention and as seen in FIG. 1, initially a pair of superposed, coextensive sheets 64 and 66 of unsupported thermoplastic material are laid onto the lower electrode 14 so as to completely cover the cavity formed therein as defined by the inner surface 22 of the blade 18, the upper surface 26 of the filler member 24, and the curved portion 28. The sheets 64 and 66 can have an outline configuration similar to the configuration of the blade 18 but should be sufficiently larger in size so as to provide material to overlap the edge 20 as seen in FIG. 1. A metallic tube 68 is then located between the sheets 64 and 66 and positioned within the groove 60 formed in the blade 18. The tube 68 has a passage formed therethrough and, depending upon the length of the tube, can serve as a support rod for the sunshade. It will be noted that when the sheets 64 and 66 are located as seen in FIG. 1, the central portion of the sheets drop by gravity into the cavity formed in the electrode 14. Also, the outer edges of the sheets 64 and 66 extend laterally beyond the sharp edge 20 of the blade 18.

The thermoplastic sheets 64 and 66 may be made from a plastic such as vinyl chloride, vinylidene chloride, or any other similar synthetic which can be formed into flexible sheets with finishes resembling leather and which can be utilized in a dielectric embossing operation. The thermoplastic sheets 64 and 66 should have a high dielectric constant which is defined as the ability of the dipole molecule in the material to rotate when subjected to an electric field. As is well known to those familiar with dielectric embossing or heating, the latter is a selected heating process that develops heat internally in an electrically insulating material by reversing the charges on the electrodes at a high frequency. As the charge is reversed, the dipole molecules rotate to keep the positive poles toward the negative electrodes and the negative poles toward the positive electrodes. This rotation of molecules produces friction which results in heat for melting the thermoplastic material.

Figure 2:
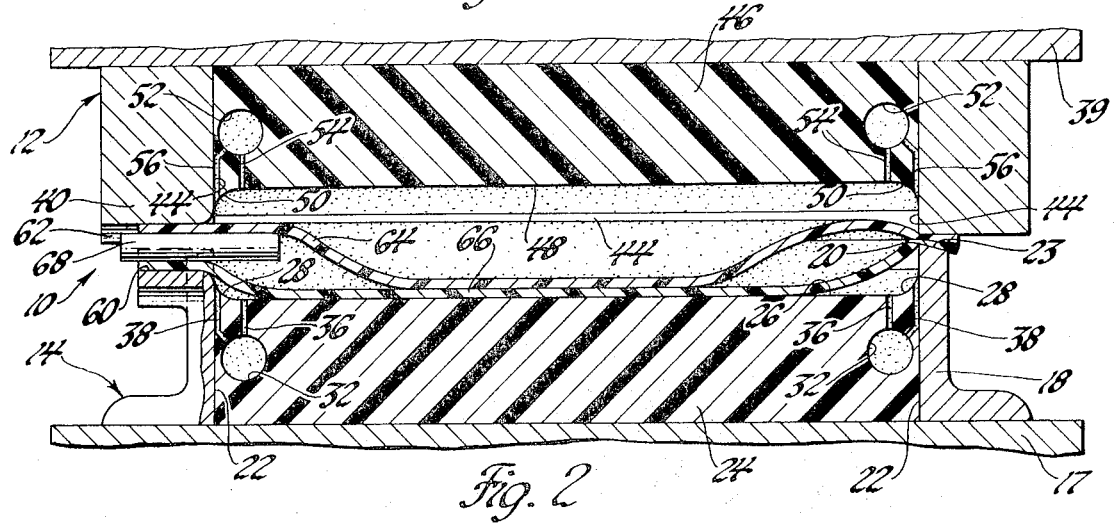
FIG. 2 is a view similar to FIG. 1 but shows the press in a closed position with the pair of thermoplastic sheets located therebetween.
Figure 3:
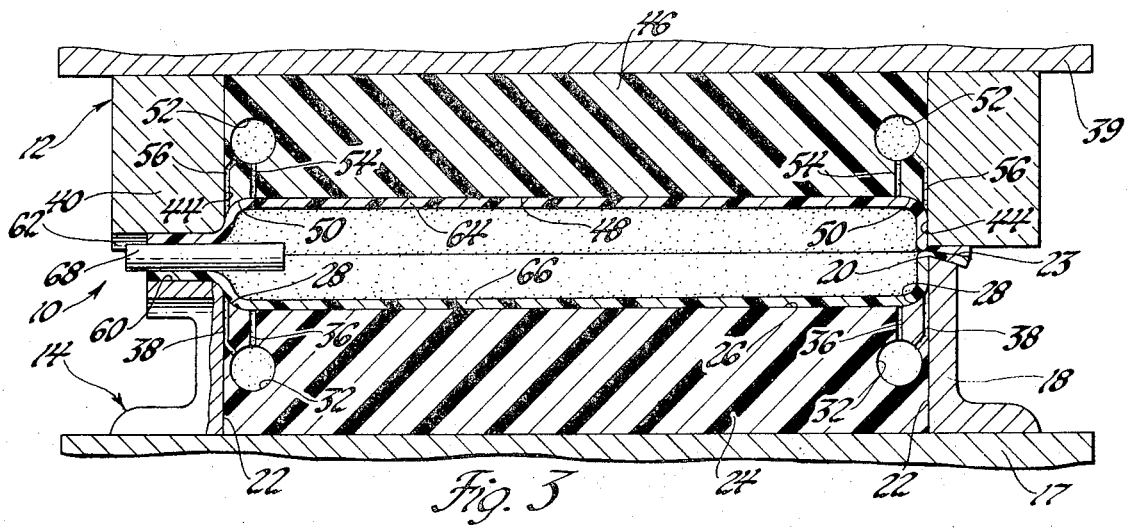
FIG. 3 is a view similar to FIG. 2 but shows the positions assumed by the thermoplastic sheets when the latter are subjected to a differential pressure.

With the thermoplastic sheets 64 and 66 being positioned as shown in FIG. 1, the dielectric embossing press 10 is closed causing the upper electrode 12 to be moved downwardly toward the lower electrode 14 until the surface 42 is sufficiently close to the edge 20 so as to compress the thermoplastic sheets 64 and 66 as seen in FIG. 2. This causes the sharp edge 20 of blade 18 to be embedded into the outer surface of sheet 64 and define a thin tear line. The portion of the sheets 64 and 66 which is located outwardly from the edge 20 gradually increases in thickness due to the inclined surface 23. Thereafter, the passages 32 and 52 in the plastic filler members 24 and 46 are connected with the source of subatmospheric pressure. This causes the pressure within the chamber defined by the cavities in the electrodes to drop below atmospheric pressure resulting in the sheets 64 and 66 to separate and move into surface engagement with the filler members 24 and 46 as seen in FIG. 3. At this juncture, it will be noted that the separation of the sheets 64 and 66 occurs due to the pressure differential which exists between the area located adjacent the outer surfaces of the sheets 64 and 66 and the area located adjacent the inner surface of the sheets. In other words, the subatmospheric pressure connected to passages 32 and 52, which respectively connect with paired passages 36, 38 and 54, 56, creates a vacuum which is then filled by air at atmospheric pressure which flows into the pocket formed between the sheets 64 and 66. The air at atmospheric pressure flows into the pocket via the opening in the tube 68.

Figure 4:
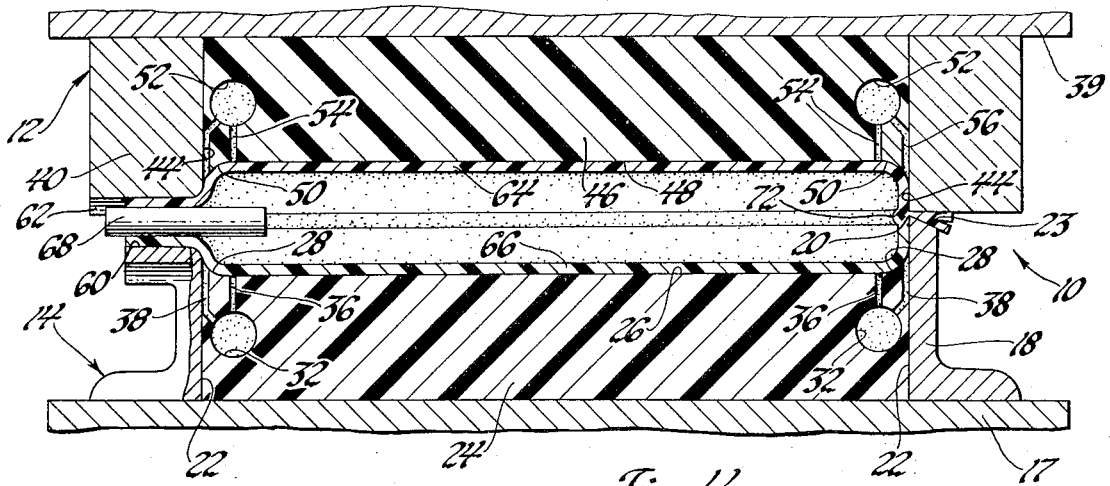
FIG. 4 is a view similar to FIG. 3 and shows the thermoplastic sheets after being subjected to the heating cycle created by the RF generator of FIG. 1.

When the thermoplastic sheets 64 and 66 assume the position shown in FIG. 3, an electric field is generated between the electrodes 12 and 14 during which time the abutting surfaces of the sheets at a point 70 soften and fuse together so as to create an inner reinforcing bead 72 as seen in FIG. 4. This occurs because the electric field created by the generator concentrates at the sharp edge 20 and inasmuch as the field is quite intense in this area it causes internal heating of the thermoplastic sheets at the point 70 where the sheets have portions 74 and 76 located in a vertical plane. After the heat cycle is completed, the dielectric embossing press 10 is opened causing the upper electrode 12 to be raised to the position shown in FIG. 5.

Figure 6:
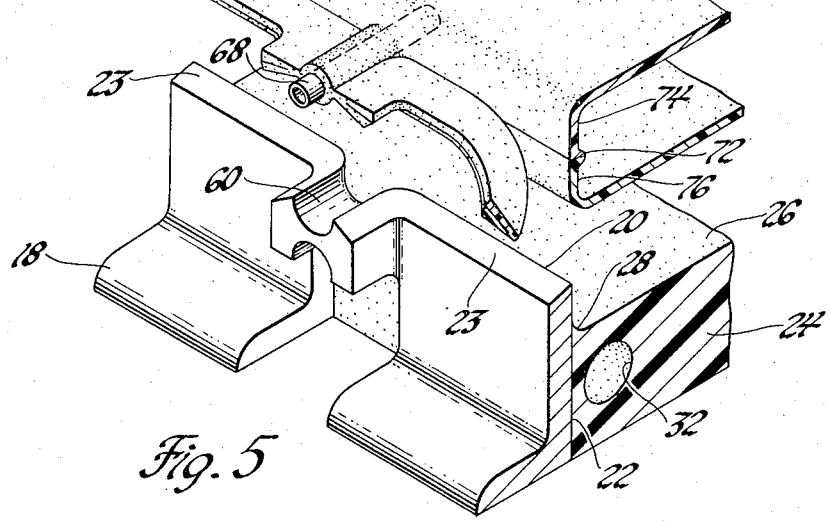
FIG. 6 is an enlarged cross-sectional view of a fused portion of the sunshade envelope.

It has been found that by forming the sunshade envelope as described above, the vertically aligned portions 74 and 76 of the sheets 64 and 66 at the abutting point 70, maintain their vertical alignment as shown in FIG. 6. Moreover, by providing the sharp edge 20 on the lower blade 18, the excess material extending laterally beyond the formed envelope as seen in FIG. 5 can be readily peeled away from the body of the sunshade envelope and leave nothing more than a smooth outside weld line which lies substantially within the plane of the outer surface of the sheets 64 and 66. The completed sunshade envelope can then be placed in a foaming mold where liquid urethane is pumped through the tube 68 into the interior of the envelope in a manner as shown in the aforementioned Nelson et al patent.

As alluded to hereinbefore, the passages 36, 38 and 54, 56 provide a means for connecting the cavities in the electrodes 12 and 14 with a source of subatmospheric pressure. The number of paired passages 36, 38 and 54, 56 to be provided along the curved portions 28 and 50 will be dependent upon the flexibility of the material used and also its thickness. It will be understood that a sufficient number of such passages should be provided along each of the curved portions 28 and 50 so that the sheets 64 and 66 will uniformly move into surface contact with the entire exposed surface of the filler members, as seen in FIG. 3, when the subatmospheric pressure is applied to the press.

Finally, it will also be noted that the depth of the cavity in each electrode will normally be one-half the thickness of the sunshade body. Sunshade bodies vary in thickness but they normally range from three-quarters of an inch to 1 inch in thickness. Furthermore, it has been found that when using thermoplastic sheets having a thickness of fifteen thousandths of an inch, the spacing between the edge 20 and the surface 42 should be approximately three thousandths of an inch when the press is closed as seen in FIG. 3 preparatory to applying the alternating current. This can be realized by providing stops which block further movement of the upper electrode 12. When using thermoplastic sheets of the latter-mentioned thickness and with the aforesaid gap between the electrodes, the heat cycle would include a voltage between 1,200 and 4,000 volts with a frequency of 30 megacycles applied for a time duration of ten seconds.

Various changes and modifications can be made in this construction without departing from the spirit of the invention. Such changes and modifications are contemplated by the inventor and he does not wish to be limited except by the scope of the appended claims.

What is claimed is:

1. A method of making an envelope in a dielectric heating press having a pair of opposed upper and lower electrodes, each of said electrodes having an identical cavity located therein with vertically orientated side walls for forming a chamber when the press is closed and one of said electrodes having a sharp upstanding continuous blade along the perimeter of the cavity thereof, said method comprising the steps of positioning a pair of superposed coextensive sheets of thermoplastic material on one of the electrodes so as to completely cover the cavity thereof and provide upper and lower sheets of thermoplastic material with parts of the sheets extending laterally beyond the cavity, closing the press so as to cause the thermoplastic material to be compressed between said electrodes along a tear line that is vertically aligned with said side walls and is created by said blade so as to form an envelope within the chamber, aligning a portion of the upper and lower sheets along the side walls of the upper and lower electrodes respectively so that the outer surfaces of the sheets within the cavity and along the side walls lie in a common plane that passes through said tear line, and applying a high frequency alternating current across said electrodes so as to establish a concentrated electric field at said blade that fuses said sheets together and joins the inner surfaces thereof so that said portion of the upper and lower sheets maintain alignment.

* * * * *